United States Patent [19]

Hayata et al.

[11] 4,213,681
[45] Jul. 22, 1980

[54] FLASH CAMERA

[75] Inventors: Toshinori Hayata, Osaka; Kunio Tsuji, Nagaokakyo; Hajime Mitsui, Osaka, all of Japan

[73] Assignee: West Electric Co., Ltd., Osaka, Japan

[21] Appl. No.: 895,761

[22] Filed: Apr. 12, 1978

[30] Foreign Application Priority Data

| Apr. 19, 1977 | [JP] | Japan | 52-45329 |
| Apr. 19, 1977 | [JP] | Japan | 52-45330 |
| Apr. 19, 1977 | [JP] | Japan | 52-45331 |

[51] Int. Cl.² .......... G03B 3/00; G03B 7/00; G03B 9/04; G03B 15/05
[52] U.S. Cl. .......... 354/21; 354/145; 354/149; 354/196; 354/273
[58] Field of Search .......... 354/21, 28, 37, 41, 354/145, 196, 273, 149

[56] References Cited

U.S. PATENT DOCUMENTS

| 3,176,599 | 4/1965 | Anwyl | 354/21 |
| 3,680,459 | 8/1972 | Okura | 354/196 |
| 3,962,707 | 6/1976 | Galbraith, Jr. | 354/196 |
| 4,041,508 | 8/1977 | Edamoto et al. | 354/273 |
| 4,063,260 | 12/1977 | Toyoshima | 354/149 |
| 4,077,041 | 2/1978 | Imura | 354/21 |
| 4,083,058 | 4/1978 | Iwata et al. | 354/145 X |
| 4,085,410 | 4/1978 | Maeda et al. | 354/21 |
| 4,121,230 | 10/1978 | Ohmura et al. | 354/21 |

Primary Examiner—L. T. Hix
Assistant Examiner—Thomas H. Tarcza
Attorney, Agent, or Firm—Burgess, Ryan and Wayne

[57] ABSTRACT

A combination of a film cartridge loading type camera with an electronic flash of the type wherein a flash lamp converts into a flash of light the energy stored in a main flash capacitor by a DC-DC converter. An optimum exposure may be ensured depending upon the speed of the film used, upon the distance to a subject and upon whether or not the flash is used.

5 Claims, 9 Drawing Figures

FIG. 8

# FLASH CAMERA

BACKGROUND OF THE INVENTION

The present invention relates to a flash camera or a combination of a camera and an electronic flash and more particularly a flash camera which may automatically set an optimum aperture depending upon the speed of the film used and upon whether or not the electronic flash is used and which may be set manually to a long-distance focusing for photographing a subject a relatively long-distance from the camera or to a close-up or short-distance focusing for taking a subject at a relatively short-distance away from the camera.

There have been recently devised and demonstrated various cameras capable of loading a film cartridge and incorporating an electronic flash. There have been also become available various types of cartridges loaded with high-speed films. Therefore the film cartridge type cameras of the type described above have been so constructed and arranged as to select an aperture depending upon the speed of a film loaded. More particularly, the camera may be set to an aperture A when a cartridge loaded with a film of ASA 100 (DIN 21) (to be referred to as "the low-speed film"), but when a film cartridge loaded with a film of ASA 400 (DIN 27) (to be referred to as "the high-speed film") is loaded, the camera may be set to an aperture B which is smaller than the aperture A. With the high-speed film and the small aperture, the depth of focus may be increased.

In case of a flash exposure with a high-speed film, when a selected aperture is equal to an aperture selected when a low-speed film is loaded, the depth of focus or a focusable range is increased as compared with the case using a low-speed film. However, when a high-speed film is loaded, the aperture is automatically set smaller so that the focusable range is not increased in practice, whereby the advantages of a high-speed film are not obtained.

Some cartridge type cameras are provided with a focus scale operatively coupled to a lens focusing mechanism so that the distance to a focused subject may be read or with a focus scale plate merely attached to the camera body. With the focus scale merely graduated with distances, erratic reading very frequently occurs. With the focus scale which indicates a distance to a focused subject, the change in focusable range or depth of focus with the use of the electronic flash or a high-speed film cannot be displayed so that a user cannot take into consideration various exposure factors which change due to the change in depth of focus.

SUMMARY OF THE INVENTION

One of the objects of the present invention is therefore to provide a flash camera which may increase the depth of focus when a flash exposure is made with a high-speed film.

Another object of the present invention is to provide a flash camera which may display the focus range or the distance to a subject depending upon the speed of a film used or loaded and upon whether or not the flash is used, whereby a user may correctly confirm the distance to a subject so as to ensure an optimum exposure.

To the above and other ends, the present invention provides a flash camera or a combination of a camera with an electronic flash, said electronic flash including at least a DC-DC converter which may step up a low DC voltage supplied from a DC power source to a high DC voltage which in turn is stored in a main flash capacitor, a flash lamp which may convert the energy stored in said main flash capacitor into a flash of light, and an on-off switch for connecting said power source to said DC-DC converter or disconnecting said power source from the latter; and said camera including at least a first aperture switching mechanism responsive to a speed of a film loaded for switching an aperture which is coaxial with the optical axis of a lens system, a focusing mechanism for focusing the lens system to a subject, and a second aperture switching mechanism responsive to the on-off operation of said on-off switch for selecting an aperture in cooperation with said first aperture switching mechanism and said focusing mechanism.

BRIEF DESCRIPTION OF THE DRAWINGS

Same reference numerals are used to designate similar parts throughout the figures.

DESCRIPTION OF THE PREFERRED EMBODIMENTS

Figure 9:
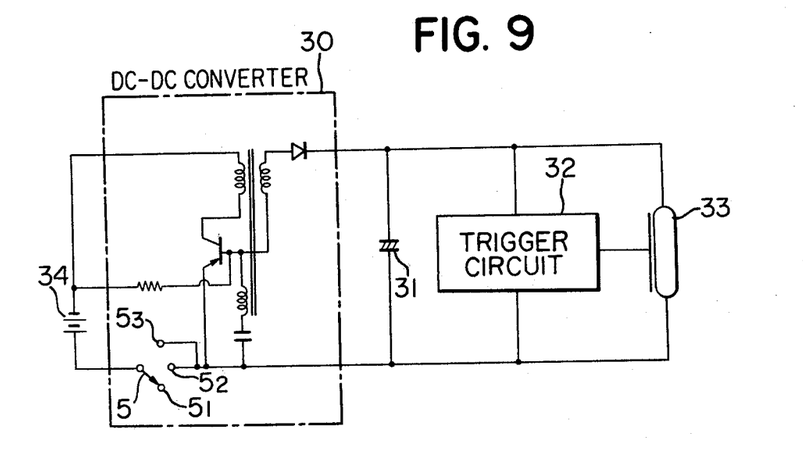
FIG. 9 is an electric circuit diagram of an electronic flash incorporated in the camera.

Referring first to FIG. 9, an electronic flash which is incorporated in a flash camera in accordance with the present invention includes a DC-DC converter 30 which steps up a low DC voltage to a high DC voltage which in turn is stored in a main flash capacitor 31. When a flash lamp 33 is excited by a high voltage trigger pulse from a trigger circuit 32, it converts the energy stored in the main flash capacitor 31 into a flash of light.

Figure 1:
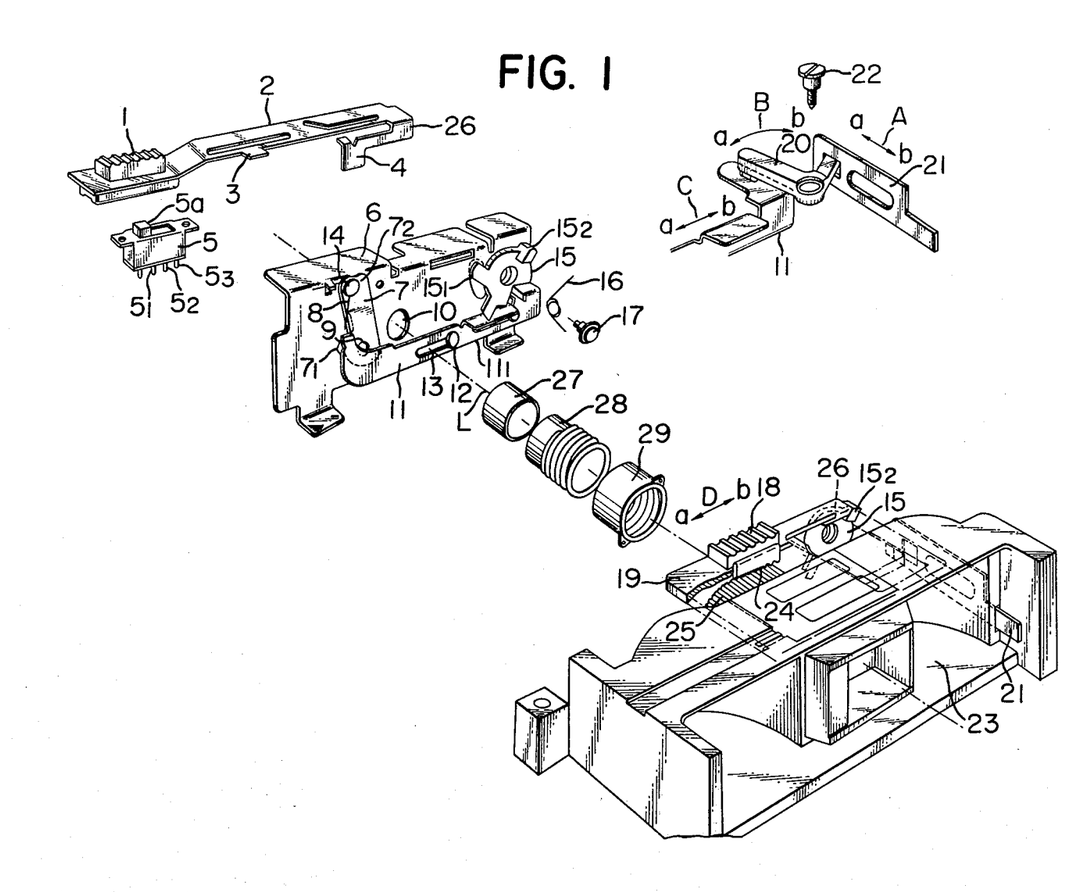
FIG. 1 is an exploded view of a flash camera in accordance with the present invention.
Figure 4:
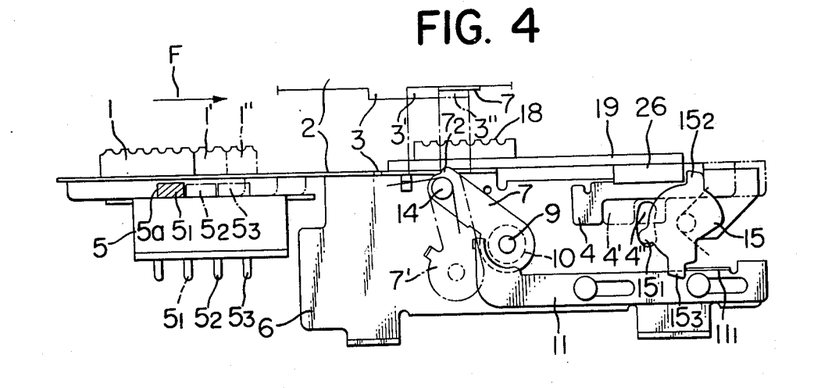
FIG. 4 is a view similar to FIG. 3 but illustrating the aperture switching mechanism in case of a flash exposure or an exposure under natural light or without the use of the flash.

A power switch 5 of this flash is of the sliding type as shown in FIG. 1. As best shown in FIG. 4 a power switch knob 1 may be selectively moved to one of three positions 1, 1' and 1" so that a knob 5a of the switch 5 may be also selectively moved to one of three positions $5_1'$, $5_2'$, and $5_3'$ and consequently the movable contact closes a fixed contact $5_1$, $5_2$ or $5_3$ as shown in FIG. 9. When the movable contact closes the contact $5_1$, a power supply 34 is disconnected but when the movable contact closes the fixed contact $5_2$ or $5_3$, the power supply 34 is connected.

It should be noted that when the movable contact closes the fixed contact $5_3$, it is immediately automatically switched to close the fixed contact $5_2$. In other words, the movable contact cannot accordingly keep closing the contact $5_3$.

Figure 2:
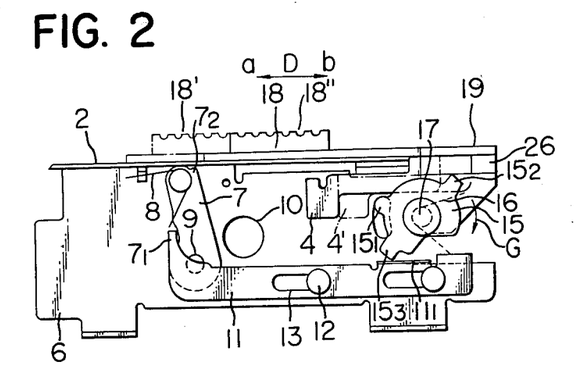
FIG. 2 shows an aperture switching mechanism when a cartridge loaded with a low-speed film is loaded in the camera.
Figure 5:
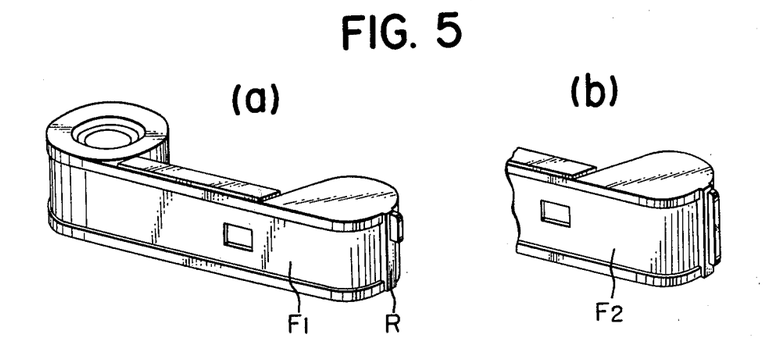
FIG. 5 shows cartridges loaded with films of ASA 400 and ASA 100, respectively.

Next an automatic aperture switching mechanism will be described. As is well known in the art, film cartridges have different projections or the like depending upon the speed of the film loaded in the cartridge as shown in FIGS. 5(a) and (b). More particularly, the film cartridge $F_1$ loading the film of ASA 400 has a short ridge R while the film cartridge $F_2$ loading the film ASA 100 has a long ridge. The automatic aperture switching mechanism responds to whether the film cartridge has a long or short ridge. That is, an actuating plate 21 (See FIG. 1) is caused to slide in the direction indicated by an arrow A so that an iris control plate 11 which controls an iris plate 7 is moved so as to control an exposure. When the low-speed film cartridge $F_2$ is loaded into a cartridge case 23, the actuating plate 21 is caused to slide in the direction indicated by a of the double-pointed arrow A so that a bell crank 20 is caused to rotate in the direction a of a double-pointed arrow B and consequently the iris control plate 11 is caused to slide in the direction indicated by a of a double-pointed arrow C. The iris control plate 11 is made into engagement with a projection $7_1$ of the iris plate 7 so that the iris plate 7 is caused to swing in the clockwise direction against a bias spring 8 so that a large-diameter iris hole 10 formed through a base plate 6 may be exposed. That is, a small-diameter iris hole 9 formed through the iris plate 7 is switched to the large-diameter iris hole 10 as shown in FIG. 2. The stroke of the iris control plate 11 is controlled by a guide pin 12 slidably fitted into an elongated slot 13 formed through the control plate 11. FIG. 1 is not intended to show the correspondence between the position of the actuating plate 21 and the aperture of the large-diameter iris hole 10 as shown therein.

Figure 3:
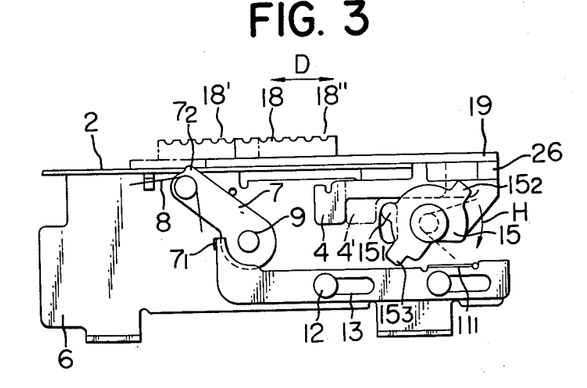
FIG. 3 shows the aperture switching mechanism when a cartridge loaded with a high-speed film is loaded in the camera.

When the high speed film cartridge $F_1$ is loaded into the cartridge case 23, the short ridge will not engage with the actuating plate 21 so that under the force of the bias spring 8 the iris plate 7 is caused to rotate in the counterclockwise direction and consequently the iris control plate 11 is caused to slide to the direction b and the bell crank 20 is caused to rotate in the direction indicated by b and the actuating plate 21 is caused to slide in the direction b. Therefore the free end (that is, the end remote from the bell crank 20) extends into the cartridge case 23, and the small-diameter iris hole 9 of the iris plate 7 is aligned with the large-diameter iris hole 10. Thus the large-diameter iris hole 10 is switched to the small-diameter iris hole 9 as shown in FIG. 3.

Next a mechanism for switching between a short-distance focusing and a long-distance focusing will be described. As shown in FIG. 1, this switching mechanism is operated with a focusing knob 18 which is selectively moved to a short-distance focusing or close-up position b indicated by a double-pointed arrow D or to a long-distance focusing position a. A lens system 27 is inserted into a lens barrel 28 and is securely fixed thereto. Externally threaded screws of the lens barrel 28 mesh with internally threaded screws of a cylindrical lens cap 29 so that the lens barrel 28 may be rotated relative to the lens cap 29. A rack gear 24 which is attached to the focusing knob 18 is in mesh with a pinion 25 which in turn is mounted on the lens barrel 28 at a portion which is not externally threaded. This assembly is referred to as "the lens assembly" in this specification.

Therefore when one slides the focusing knob 18 fully to the direction a, the rack gear 24 causes the pinion 25 to rotate so that the lens barrel 28 is rotated to the standard focusing position or the long-distance focusing position. In like manner when one slides the focusing knob 18 fully to the direction b, the lens barrel 28 is rotated in the opposite direction to the short-distance focusing position. That is, in FIGS. 2 and 3 the focusing knob 18 may be selectively moved to the standard focusing position 18' or the short-distance focusing position 18".

Next the mode of operation of the flash camera with the above construction will be described.

(1) With high-speed film:

(1)-1 Exposure without flash:

When the high-speed film cartridge is loaded into the camera, the small-diameter iris hole 9 is automatically selected as shown in FIG. 3. Therefore one slides the focusing knob 18 to the short-distance focusing position 18" or the standard focusing position 18' and then depresses a shutter release button (not shown).

(1)-2 Flash exposure of a subject at a long-distance:

Referring to FIG. 4, one slides the power switch knob 1 to the direction F to the position 1'. Then the movable contact of the power switch 5 closes the fixed contact $5_2'$ so that the electronic flash is connected to the power source 34 as shown in FIG. 9. A projection 3 and a bent portion 4 of a control plate 2 are moved to the positions 3' and 4' (See FIG. 4). Therefore one may depress the shutter release button for a flash exposure. The aperture is set by the small-diameter iris hole 9.

The focusing knob 18 has been set to the long-distance focusing position 18' so that a projection 26 of a base plate 19 is out of engagement with a projection or a tooth $15_2$ of an iris plate locking ratchet wheel 15 and consequently a projection or a tooth $15_1$ is at the lower position. The power switch knob 1 may be slid from the position 1' to the position 1" in the direction F against the biasing force, causing the projection 3 and the bent portion 4 of the control plate 2 to advance further to the positions 3" and 4", respectively, from the positions 3' and 4' and the knob 5a is moved to the position $5_3'$ from the position $5_2'$. As a result, the projection 3 of the control plate 2 engages with a projection $7_2$ of the iris plate 7 so that the iris plate 7 is caused to rotate in the clockwise direction about a pin 14 to the position 7'. However the iris control plate 11 remains stationary. As a consequence the small-diameter iris hole 9 is switched to the large-diameter iris hole 10 so that a flash exposure of a long-distance subject may be attained.

(1)-3 Flash exposure of a subject at a short distance:

One slides the focusing knob 18 to the short-distance or close-up position 18" and the power switch knob 1 to the position 1'. When one slides the power switch knob 1 too much to the position 1", the exposure would be made through the large-diameter iris hole 10 as described above so that an overexposure would result. In order to prevent such erratic operation and to have the exposure made through the small-diameter iris hole 9, means must be provided for preventing the power switch knob 1 from moving to the position 1".

With the focusing knob 18 at the short-distance focusing position 18", the projection 26 is made into engagement with the projection or the tooth $15_2$ of the iris plate locking ratchet wheel 15 so that the ratchet wheel 15 is caused to rotate in the direction indicated by an arrow H as shown in FIG. 3 and consequently the locking projection or the tooth $15_1$ is moved to the upper position. Therefore when one slides the power switch knob 1 to the position 1', the bent portion 4 at the position 4' engages with the locking projection $15_1$ so that the bent portion 4 and hence the power switch knob 1 are not permitted to slide further to the left. Thus the power switch knob 1 may be positively prevented from being overrun to the position 1'' and may be stopped at the position 1'. Therefore a flash exposure of a subject at a short-distance is made through the small-diameter iris hole 9.

(2) With low-speed film:

(2)-1 Exposure without flash:

When one loads a low-speed film cartridge into the camera, the small-diameter iris hole 9 is switched to the large-diameter iris hole 10 as shown in FIG. 2. Thereafter one slides the focusing knob 18 to the standard focusing position 18' or the short-distance focusing position 18'', and depresses the shutter release button while keeping the power switch knob 1 in the position 1.

(2)-2 Flash exposure:

One slides the power switch knob 1 to the position 1', thereby turning on the electronic flash.

The control plate 11 is in the position shown in FIG. 2 so that a projection $11_1$ of the control plate 11 is made into engagement with a projection or a tooth $15_3$ of the ratchet wheel 15 and consequently the projection $15_1$ is in the upper position. As a result, the overrun of the power switch knob 1 to the position 1'' may be prevented in the manner described above.

If the overrun of the power switch knob 1 to the position 1'' should occur, one would think that a flash exposure of a subject at a long-distance may be possible. The present invention may present this erratic operation.

As described above, according to the present invention, one may take a photo under optimum exposure conditions depending upon a speed of a film used, upon a distance to a subject and upon whether a flash is used or not. With a high-speed film, one may take a photo of a subject at a long-distance from the camera.

Furthermore according to the present invention, various exposure conditions such as a speed of a film used, a distance to a subject and whether or not the electronic flash is used may be displayed as will be described in detail hereinafter so that an erratic operation may be completely eliminated.

Figure 6:
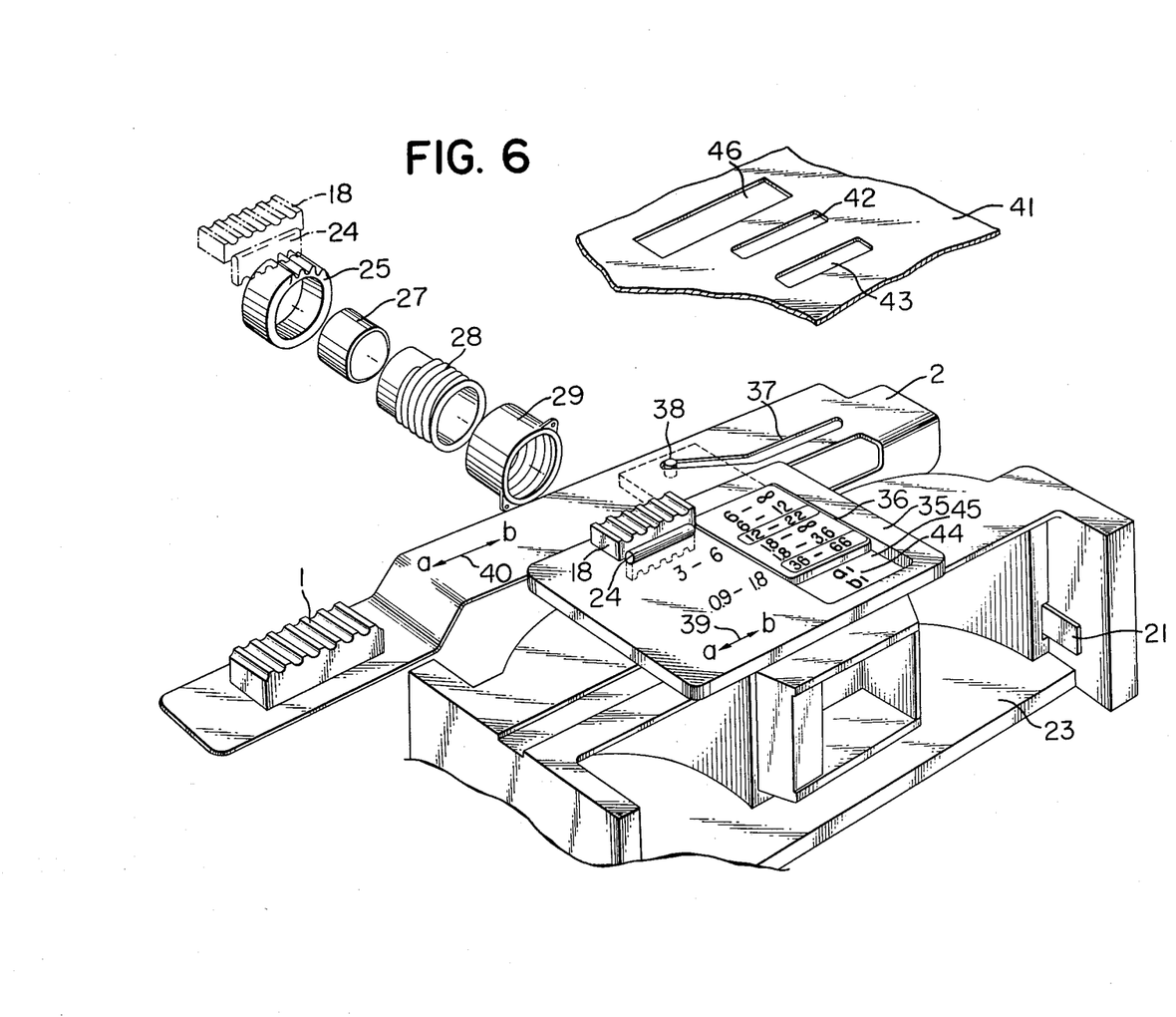
FIG. 6 is an exploded view of a flash camera of the type shown in FIG. 1 but provided with display means.
Figure 7:
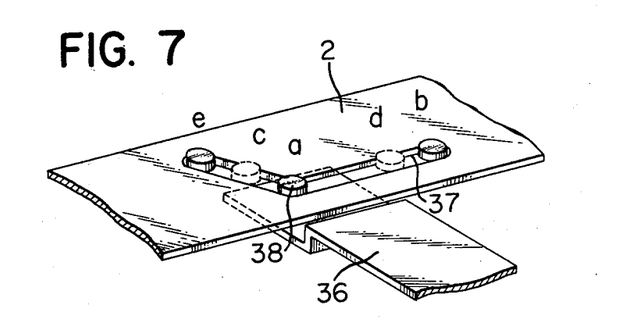
FIG. 7 is a fragmentary perspective view of a control plate 2 and a second display plate 36 of the flash camera shown in FIG. 6, the view being used for explanation of the position of a pin 38 relative to a rocker-shaped slot 37.
Figure 8:
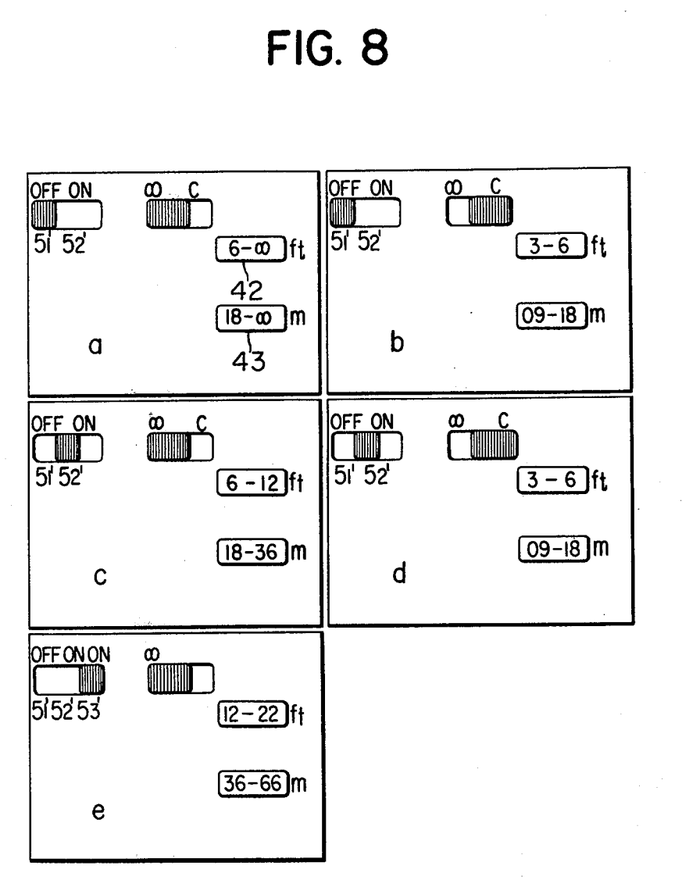
FIG. 8 shows the relation between the positions of an on-off switch knob and a focusing knob on the one hand and the focus or distance range display.

Referring to FIGS. 6, 7 and 8, the focusing knob 18 is mounted on a first display plate 35 which is slidable in the directions indicated by a double-pointed arrow 39 and which is marked with distances to a subject. A second display plate 36 is fitted into a rectangular opening 45 of the first display plate 35 for slidable movement in the directions indicated by a double-pointed arrow 44. A pin 38 which is extended from the second display plate 36 is slidably fitted into a rocker-lever-shaped slot 37 formed through the control plate 2.

A cover 41 has a first and second windows 42 and 43 through which the distance mark on the first display plate 35 and the distance mark on the second display plate 36 may be viewed, a slot 46 into which is slidably fitted the focusing knob 18 and another slot (not shown) into which is slidably fitted the power switch knob 1.

Next the relationship between the displays and exposure conditions will be described.

(1) Exposure without a flash or under natural lighting:

The power switch knob 1 is moved to the direction a indicated by the double-pointed arrow 40 to the off position, and depending upon the distance to a subject the focusing knob 18 is moved to the standard focusing position or the short-distance focusing position in the manner described elsewhere. With a camera having a fixed shutter speed and a fixed aperture, a focusable range varies depending upon a speed of a film used, but according to the present invention, an aperture is selected depending upon a speed of a film used so that the focusable range is dependent upon the depth of focus of the lens system and independent of a speed of a film.

When the focusing knob 18 is moved to the standard focusing position, the first and second display plates 35 and 36 are caused to slide. The rack gear 24 of the focusing knob 18 causes the pinion 25 to rotate so that the lens barrel 28 upon which is securely fitted the pinion 25 is also caused to rotate. As a result, the lens system 27 is moved toward the film. As the second display plate 36 is moved to the left, its pin 38 slides through the slot 37 to the position a or the bend shown in FIG. 7 so that as shown in FIG. 8a "6-∞" (ft) and "1.8-∞" (m) may be viewed through the first and second windows 42 and 43 of the cover 41.

When the focusing knob 18 is moved to the direction b indicated by the double-pointed arrow 39 to the short-distance focusing position, the first and second display plates 35 and 36 are caused to slide in the direction b indicated by the double-pointed arrows 39 and 44 and the lens system 27 is moved away from the film. The pin 38 of the second display plate 36 slides through the slot 37 of the control plate 2 which is held stationary to the position b shown in FIG. 7. Therefore, as shown in FIG. 8b, "3-6" (ft) and "0.9-1.8" (m) may be viewed through the first and second windows 42 and 43, respectively.

(2) Flash exposure:

(2)-1 With a low-speed film:

The power switch knob 1 is moved from the off position $5_1'$ to the on position $5_2'$ in the direction b indicated by the double-pointed arrow 40. Then the focusing knob 18 may be caused to move to two different directions, a and b as recited hereinbefore. When the focusing knob 18 is moved to the direction a indicated by the double-pointed arrow 39 to the long-distance focusing position, the pin 38 of the second display plate 36 is caused to move from the position a to the position c (See FIG. 7). In other words, the second display plate 36 is moved to the direction a indicated by the double-pointed arrow 44 relative to the control plate 2. Therefore "6-12" (ft) and "1.8-3.6" (m) are viewed through the first and second windows 42 and 43 as shown in FIG. 8c.

When the focusing knob 18 is moved to the direction b indicated by the double-pointed arrow 39 to the short-distance focusing position, the pin 38 slides through the slot 37 from the position b to the position d. Since this section from b to d of the slot 37 is in parallel with the control plate 2, the second display plate 36 is not moved in the direction a or b. Therefore the distance marks viewed through the first and second windows 42 and 43 are same with the distance marks in case of the short-distance focusing with no flash. That is, "3-6" (ft) and "0.9-1.8" (m) are viewed through the first and second windows 42 and 43 as shown in FIG. 8d.

(2)-2 With a high-speed film:

When a high-speed film cartridge is loaded, the small-diameter iris hole 9 is brought to the operative position as described elsewhere so that a subject relatively close to the camera may be photographed.

The power switch knob 1 is moved to the position $5_2'$, and the focusing knob 18 is moved to the direction a or b. Then the distance marks are displayed as shown in FIG. 8c or 8d as described above.

When it is desired to take a photo of a subject at a relatively long distance from the camera, the power switch knob 1 is moved to the direction b of the double-pointed arrow 40 and the focusing knob 18 is moved in the direction a indicated by the arrow 39. Therefore the power source is turned on and the lens system 27 is moved toward the film. With the use of a high-speed film, a guide number of the electronic flash is increased so that a subject at a long-distance from the camera may be photographed.

The power switch knob 1 is moved to the position $5_3'$ so that the control plate 2 is also moved in the same direction. As a result, the pin 38 of the second display plate 36 slides through the inclined section of the slot 37 from the position c shown in FIG. 7 to the position e. That is, the pin 38 slides in the direction a indicated by the double-pointed arrow 44 relative to the first display plate 35. Therefore, the distance marks are displayed as shown in FIG. 8e.

What is claimed is:

1. A flash camera comprising in combination a camera and an electronic flash, said electronic flash including:
   (a) a DC-DC converter for stepping up a low DC voltage supplied from a DC power source to a high DC voltage which in turn is stored in a main flash capacitor,
   (b) a flash lamp for converting the energy stored in said main flash capacitor into a flash of light, and
   (c) a power on-off switch for selectively connecting said power source to said DC-DC converter or disconnecting said power source from said DC-DC converter; and
said camera including:
   (d) a first aperture switching mechanism responsive to a speed of a film loaded into said camera for selecting an iris opening of corresponding diameter, the axis of said iris opening being coaxial with the optical axis of a lens system,
   (e) a focusing mechanism for focusing said lens system on a subject, and
   (f) a second aperture switching mechanism responsive to the operation of said on-off switch for selecting said iris opening in cooperation with said first aperture switching mechanism and said focusing means, said second aperture switching mechanism comprising:
      a first control means upon which is mounted a knob for turning on or off said on-off switch, and
      a second control means responsive to the operations of said first aperture switching mechanism and said focusing mechanism for controlling said first control means,
whereby when (i) a film having a high speed is loaded in said camera, said camera is not set for flash operation with focusing on a subject at a long distance therefrom, said first aperture switching mechanism may select said small-diameter iris opening, when (ii) said high-speed film is loaded in said camera, the power on-off switch is in the on position and said focusing mechanism is focused at a subject at a long distance from said camera said first control means causes said first aperture switching mechanism to select said large diameter opening, and when (iii) a film having a low speed is loaded in said camera, said first aperture switching mechanism may select said large-diameter opening and said second control means may prevent the switching operation of said first aperture switching mechanism caused by said first control means.

2. A flash camera as set forth in claim 1 wherein said first control means comprises an operative control plate and further includes
   a first display plate operatively coupled to said focusing mechanism and marked with distance marks in first unit, and
   a second display plate which is combined with said first display plate, is marked with distance marks in second unit and is operatively coupled to said aperture control plate.

3. A flash camera as set forth in claim 2 wherein
   said first display plate is formed with a rectangular opening, said aperture control plate is formed with a rocker-lever-shaped slot,
   said second display plate has a pin which is slidably fitted into said rocker-lever-shaped slot of said aperture control plate, and
   said first and second display plates and said aperture control plate are so operatively connected to each other that said distance marks on said second display plate may slide in an opening having said shape.

4. A flash camera as set forth in claim 2 wherein a case is formed with windows through which are viewed said distance marks in one unit on said first display plate and said distance marks in second unit on said second display plate.

5. A flash camera as set forth in claim 1 wherein said first aperture switching mechanism comprises means for sensing a speed of a film loaded in said camera, a base plate having a first opening, and iris plate which has a second opening with a diameter smaller than the diameter of said first opening and which is pivoted to said base plate in such a way that said second opening may be moved toward said first opening and made in line therewith or moved away therefrom, and an interconnecting mechanism between said film speed sensing means and said iris plate for causing said iris plate to move toward or away from said first opening of said base plate in response to the output from said film speed sensing means.

* * * * *

UNITED STATES PATENT OFFICE
CERTIFICATE OF CORRECTION

Patent No. 4,213,681         Dated July 22, 1980

Inventor(s) Toshinori Hayata, et al

It is certified that error appears in the above-identified patent and that said Letters Patent are hereby corrected as shown below:

In the Abstract, line 6: "upon the" should be --the--.

Signed and Sealed this

Third Day of November

[SEAL]

Attest:

GERALD J. MOSSINGHOFF

Attesting Officer    Commissioner of Patents and Trademarks